(12) United States Patent
Lott et al.

(10) Patent No.: US 7,795,771 B2
(45) Date of Patent: Sep. 14, 2010

(54) ROTOR AND AN ELECTRICAL MACHINE COMPRISING SUCH A ROTOR

(75) Inventors: Thomas Lott, Buehl (DE); Helmut Meier, Renchen (DE); Andreas Wehrle, Durbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/097,115

(22) PCT Filed: Nov. 2, 2006

(86) PCT No.: PCT/EP2006/068024
§ 371 (c)(1),
(2), (4) Date: Jun. 12, 2008

(87) PCT Pub. No.: WO2007/079993
PCT Pub. Date: Jul. 19, 2007

(65) Prior Publication Data
US 2008/0290762 A1 Nov. 27, 2008

(30) Foreign Application Priority Data
Dec. 29, 2005 (DE) .................. 10 2005 062 865

(51) Int. Cl.
*H02K 21/12* (2006.01)
*H02K 11/00* (2006.01)
*G01B 7/14* (2006.01)

(52) U.S. Cl. .................. 310/156.22; 310/156.38; 310/68 R; 324/207.11

(58) Field of Classification Search ................. 310/156.01–156.84
See application file for complete search history.

(56) References Cited

U.S. PATENT DOCUMENTS

| 4,633,109 | A  | * | 12/1986 | Feigel ............ 310/68 R |
| 6,172,585 | B1 | * | 1/2001  | Zindler et al. ...... 335/202 |
| 6,712,585 | B2 | * | 3/2004  | Iehl et al. ........... 417/42 |
| 2004/0119349 | A1 |   | 6/2004 | Nickel-Jetter et al. |
| 2007/0138889 | A1 | * | 6/2007 | Maldener et al. ...... 310/156.22 |
| 2007/0278868 | A1 | * | 12/2007 | Nickel-Jetter et al. ..... 310/46 |

FOREIGN PATENT DOCUMENTS

| DE | 10 2004 017716 | 10/2005 |
| EP | 0 299 137 | 1/1989 |
| JP | 11299206 A * | 10/1999 |
| WO | 2005/099065 | 10/2005 |

OTHER PUBLICATIONS

Machine Translation JP11299206A (1999).*
Translation Derwent Text (Novelty , Use and Advantage) JP11299206A (1999).*

* cited by examiner

*Primary Examiner*—Quyen Leung
*Assistant Examiner*—Jose A Gonzalez Quinones
(74) *Attorney, Agent, or Firm*—Michael J. Striker

(57) ABSTRACT

A rotor of an electrical machine has at least one hollow-cylindrical, first permanent magnet with axial bearing surfaces that interact with at least one retaining element and with a sensor magnet assembly, and the first permanent magnet and the sensor magnet assembly are retained axially between two retaining elements.

13 Claims, 1 Drawing Sheet

ROTOR AND AN ELECTRICAL MACHINE COMPRISING SUCH A ROTOR

CROSS-REFERENCE TO RELATED APPLICATION

The invention described and claimed hereinbelow is also described in German Patent Application DE 10 2005 062 865.6 filed on Dec. 29, 2005. This German Patent Application, whose subject matter is incorporated here by reference, provides the basis for a claim of priority of invention under 35 U.S.C. 119(a)-(d).

BACKGROUND OF THE INVENTION

The present invention relates to a rotor and an electrical machine that includes such a rotor.

German patent application DE 10 200 40 177 16 makes known an electrical machine with a rotor, with which a working magnet designed as a hollow cylinder is mounted on an armature shaft. The working magnet includes axial bearing surfaces, which interact with corresponding axial clamping surfaces of two retaining elements installed on the rotor. The clamping surfaces include radially extending ridges to accommodate a radial expansion of the working magnet. In addition, a sensor magnet is mounted on the rotor using a separate holder. A manufacturing process with which the working magnet and the sensor magnet are installed separately in this manner is relatively complex in terms of parts and the process itself.

SUMMARY OF THE INVENTION

The inventive device has the advantage that, given that the first permanent magnet and the sensor magnet assembly are both held between two retaining elements, the amount of assembly and parts required to attach the sensor magnet and the working magnet is markedly reduced. In addition, the sensor assembly may be mounted axially closer to the working magnet, thereby reducing axial installation space. By installing the working magnet together with the sensor assembly between two retaining elements, the tolerance chain of the components involved may be favorably influenced.

When the first permanent magnet and the sensor assembly are clamped between the two retaining elements using elastic elements, the permanent magnet may deform axially, e.g., due to temperature, without it coming loose from the holder. The elastic, axial support simultaneously allows the permanent magnet to expand radially. The spring element may be designed as one or more separate, elastic lock washers, or as an integral component of the retaining elements.

It is favorable when the retaining elements are designed as sleeves located on the armature shaft, which include an annular, axial shoulder as a bearing surface for the permanent magnet and the sensor magnet assembly, and against which the permanent magnet and the sensor magnet assembly bear directly or indirectly.

In a preferred embodiment, the permanent magnet is designed as the working magnet of an electrically commutated motor or generator, which is made, e.g., of a sintered material or a plastic-bonded material. The permanent magnet may be designed as a single piece, or it may be composed of several parts.

When the sensor assembly includes a carrier ring for attaching the at least one annular magnet, it may be reliably clamped axially—together with the permanent magnet—between the retaining elements, thereby simultaneously offering a great deal of variability for the specific positioning and orientation of the annular magnets.

The carrier ring may be designed, e.g., as a flat disk, on which the magnetic tracks are located, on an axial surface. The design is suited for interplay with axially positioned magnetic sensors, the surfaces—which are sensitive to a magnetic field—of which extend transversely to the armature shaft. In an alternative embodiment, the carrier ring is designed as a cylindrical sleeve, on the cylindrical jacket wall of which the magnetic tracks are attached, for interaction with radially located magnetic sensors.

The carrier ring includes bearing surfaces in its radially inward region, on both axial sides, with which the carrier ring is clamped axially between the two retaining elements. By attaching the sensor magnets in this manner, the annular magnets are not loaded mechanically, and they have enough free space to expand thermally.

When a spacer component is located between the permanent magnet and the sensor assembly, a fixed distance may be specified between the sensor magnets and the working magnet, via which the winding overhang of the stator—which extends axially beyond the working magnets—and related connecting elements of the electrical windings are bridged.

By designing the spacer component as a spacer tube, it may be clamped—directly or indirectly—between related bearing surfaces of the permanent magnet and the carrier ring using intermediate rings, thereby greatly simplifying the assembly of both magnets.

Due to the elastic axial support of the pressure-sensitive permanent magnet, the retaining elements may be fixed on the armature shaft in a non-rotatable and non-slidable manner using traditional attachment means. Particularly suitable means of attachment include snap rings, spring components, welding, bonding, or plastic material deformation.

The rotor is preferably installed in an EC machine, with which the permanent magnet is set into rotation via an electrically commutated magnetic field of the stator. A magnetic sensor is also located on the EC motor, which interacts with the sensor magnet assembly in order to detect the rotational position of the rotor for the commutation of the stator coils.

Using the inventive manufacturing method, it is possible to attach several components jointly on the rotor shaft in one assembly procedure. The number of components and the assembly costs are reduced, since separate retaining elements for the sensor magnet assembly are not required for assembly.

Various exemplary embodiments of a device according to the present invention are presented in the drawing and are described in greater detail in the description below.

DESCRIPTION OF THE EXEMPLARY EMBODIMENTS

Figure 1:
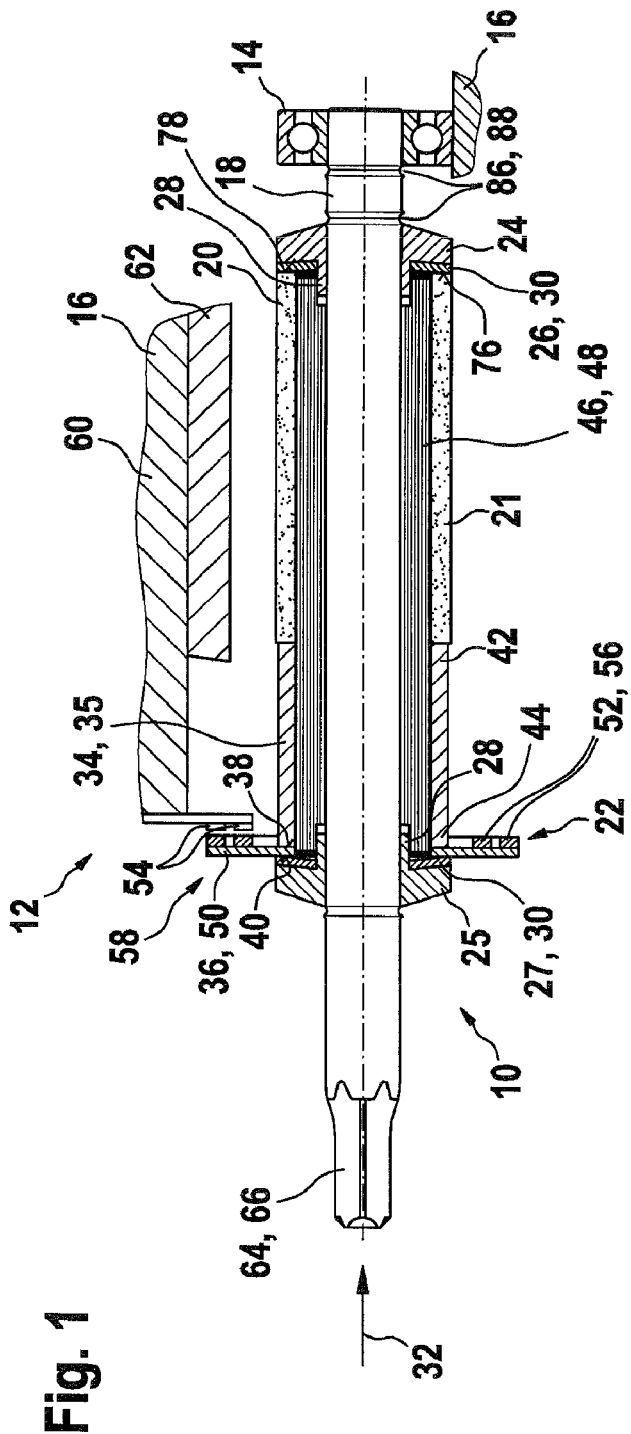
FIG. 1 shows a cross section through an inventive electrical machine.

FIG. 1 shows an electrical machine 12, with which a rotor 10 is supported in a not-shown housing 16 using sliding or ball bearings 14. Rotor 10 includes a rotor shaft 18, on which a first permanent magnet 20 and a sensor magnet assembly 22 are mounted using retaining elements 24, 25. In the exemplary embodiment, permanent magnet 20 is designed as a single-pieced, hollow cylinder 21, which is made, e.g., of sintered material or plastic-bonded material, and which contains, in particular, iron and/or rare earth elements, and preferably NdFeB. Retaining elements 24, 25 are designed in the shape of sleeves and they are attached to rotor shaft 18 via a material deformation 86 of rotor shaft 18. The plastic material deformation is designed, e.g., as a turned groove 88. First retaining element 24 includes a first spring element 26, which is located on an axial projection 28 of first retaining element 24. Spring element 26 is designed as a disk spring 30 in this case, and it is deformable in axial direction 32. A spacer sleeve 35, which serves as a spacer component 34, is located axially adjacent to first permanent magnet 20, and serves to define a specifiable distance from sensor magnet assembly 22. Sensor magnet assembly 22 includes an annular carrier 36 that includes two bearing surfaces 38 and 40 on its radially inner region, with which carrier 36 is clamped axially between retaining elements 24, 25. Second retaining element 25 includes a second spring element 27, which bears against second axial stop surface 40 of carrier 36. Spacer component 34 bears via a first axial end 42 against a first permanent magnet 20 and via a second axial end 44 against second stop surface 38. A magnetic return element 48, as a rotor body 46, is located inside first permanent magnet 20, to amplify the magnetic flux of permanent magnet 20. Rotor body 46 extends along spacer component 34. Annular carrier 36 is designed as a flat disk 50, on first axial surface 38 of which two annular magnets 52 are axially located. The two annular magnets 52 are two separate magnetic tracks 56, each of which may interact separately with a magnetic sensor 54 of electric motor 12. Magnetic tracks 56 are designed as concentric annular magnets 52 with different radii. The magnetically sensitive surfaces of magnetic sensors 54 are oriented approximately perpendicularly to rotor shaft 18, at a minimal axial distance from magnetic tracks 56, Via magnetic tracks 56, which have been magnetized accordingly, the rotational position and oriention of rotor 10 may be detected. Rotational position detection 58 is used to perform electrical commutation of electrical windings 62 located on a stator 60, and/or to detect the position of a component that is driven using electric motor 12. A spur gear toothing 66—as output element 64—is formed on rotor shaft 18, and engages in a not-shown, matching transmission component.

Figure 2:
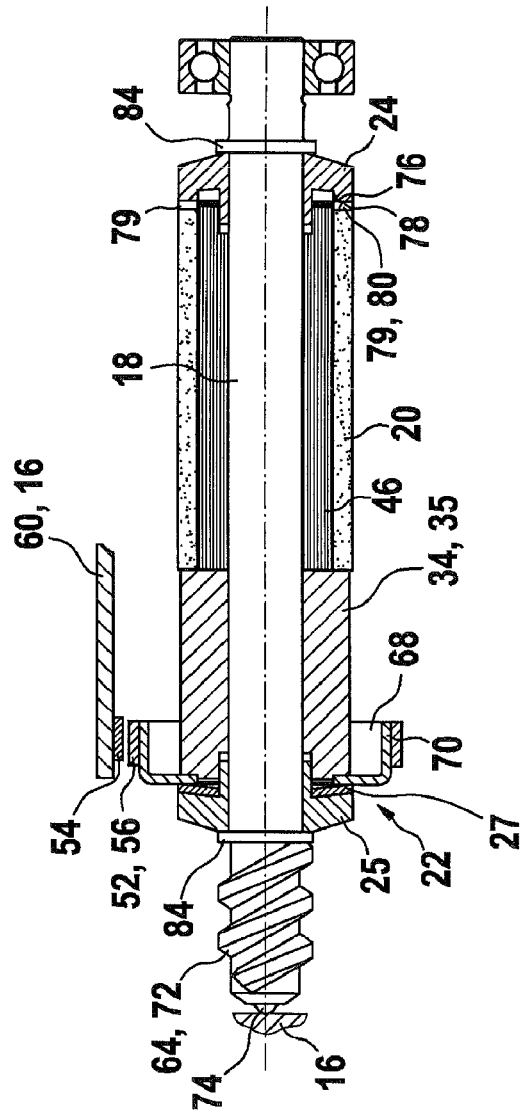
FIG. 2 shows a further exemplary embodiment of an inventive rotor, in a cross-sectional view.

A further exemplary embodiment of a rotor 10 is shown in FIG. 2, with which annular carrier 36 is designed as sleeve 68 with an outer cylindrical jacket wall 70. An annular magnet 52—as a single magnetic track 56—is located around the outer circumference of cylindrical wall 70. Annular magnet 52 interacts with a magnetic sensor 54, which is located radially relative to sleeve-shaped carrier 36. The sensitive surface of magnetic sensor 54 is located tangentially to rotor shaft 18. With both exemplary embodiments, it is possible to also locate several magnetic tracks 56 axially next to each other, magnetic tracks 56 interacting with several matching magnetic sensors 54. A worm gear toothing 72—as output element 64—is located on rotor shaft 18. Worm gear toothing 72 may transfer a drive torque to a related adjustment mechanism. Rotor shaft 18 bears against housing 16, e.g., with a domed end 74. First permanent magnet 20, spacer part 34, and sensor magnet assembly 22, in turn, are all clamped axially between retaining elements 24 and 25. Spacer component 34 is located directly on rotor shaft 18. Only second retaining element 25 includes a single second spring element 27, which provides the axial contact force. Permanent magnet 20 has a coating 79 made of a softer material on its bearing surface 76, as the counter-surface 78 of retaining element 24. Bearing surface 76 is annular in design and bears directly against annular counter-surface 78. Retaining element 24 has a profiling 80, which is designed, e.g., as radial ridges 82, thereby enabling permanent magnet 20 to be supported such that it is movable radially within certain limits. In this example, retaining elements 24, 25 are fixed in position axially on the shaft using snap rings 84.

To assemble inventive rotor 10, e.g., first retaining element 24 is fixed in position on rotor shaft 18, e.g., via plastic material deformation 86. As a result, first spring element 26 bears axially against counter-surface 78 of first retaining element 24. As an option, rotor body 46 is then slid onto rotor shaft 18 and past axial extension 28. First permanent magnet 20 is now slid onto rotor shaft 18 until it bears against first spring element 26. Spacer component 34 is then slid onto rotor shaft 18. Next, annular carrier 36 of sensor magnet assembly 22 is installed axially on rotor shaft 18, then it is pressed axially against first retaining element 24 with a specifiable contact force using second spring element 27 of second retaining element 25. Second retaining element 25 is fixed in position axially on rotor shaft 18, preferably also via material deformation 86. As a result, the three components 20, 34, 36 are supported between the two retaining element 24 and 25 in an axially resilient manner, in a single installation process. Rotor 10 is then installed in housing 16 of electric motor 12, and magnetic sensors 54 are positioned opposite to magnetic tracks 56.

It should be noted that, with regard for the exemplary embodiments presented in the figures and the description, many different combinations of the individual features are possible. For example, the specific design of retaining elements 24, 25 with spring elements 26, 27 and their installation on rotor shaft 18 may be varied. For instance, spring elements 26, 27 may be an integral component of retaining elements 24, 25. In addition, further intermediate rings may be located between permanent magnet 20, spacer component 34, and sensor magnet assembly 22. Likewise, the surfaces of bearing surfaces 76 and counter-surfaces 78, and the further intermediate spaces, may be coated or profiled, in order to adjust the frictional properties accordingly. It is also possible to vary the materials used to make permanent magnet 20, annular magnet 52, annular carrier 36, spacer sleeve 34, and the coatings to meet the particular requirements. Inventive rotor 10 is preferably used for EC motors, which are used to adjust movable parts in a motor vehicle.

What is claimed is:

1. A rotor (10) of an electrical machine (12), comprising two rotatable retaining elements which are axially spaced from one another, at least one hollow-cylindrical, first permanent magnet (20), and a sensor magnet assembly (22), wherein the first permanent magnet (20) and the sensor magnet assembly (22) are arranged one after the other in an axial direction and axially bear with their opposite ends against the rotatable retaining elements so as to be retained axially between the two rotatable retaining elements (24, 25).

2. The rotor (10) as recited in claim 1, wherein the two retaining elements (24, 25) together include at least one spring element (26, 27)—a disk spring, in particular (30)—that elastically loads the first permanent magnet (20) and the sensor magnet assembly (22) axially against the two retaining elements (24, 25).

3. The rotor (10) as recited in claim 1, wherein the retaining elements (24, 25) are designed as sleeves (23) with an axial shoulder (78) against which the first permanent magnet (20) and the sensor magnet assembly (22) bear axially.

4. The rotor (10) as recited in claim 1, wherein the first permanent magnet (20)—as the working magnet—is designed as an EC motor or an EC generator.

5. The rotor (10) as recited in claim 1, wherein the sensor magnet assembly (22) includes an annular carrier (36), on which at least one annular magnet (52) is installed.

6. The rotor (10) as recited in claim 1, wherein the sensor magnet assembly (22) includes more than one annular magnetic track (56), which are detectable using axially or radially-positioned magnetic sensors (54).

7. The rotor (10) as recited in claim 1, wherein the carrier (36) includes two axial bearing surfaces (38, 40), on which the two retaining elements (24, 25) exert an axial force.

8. The rotor (10) as recited in claim 1, wherein a spacer component (34) is located between the first permanent magnet (20) and the sensor magnet assembly (22).

9. The rotor (10) as recited in claim 1, wherein the spacer component (34) is designed as a spacer tube (35), and it is pressed via one axial side (44) against the carrier (36) of the sensor magnet assembly (22), and via its other axial side (42) against the permanent magnet (20).

10. The rotor (10) as recited in claim 1, wherein the retaining elements (24, 25) are non-rotatably fixed on the rotor shaft (18) using snap rings (84), spring components, laser welding, bonding, material deformation, or shrink fitting.

11. An electrical machine (12) with a rotor (10) as recited in claim 1,
wherein the first permanent magnet (20) interacts with a magnetic field that encloses the rotor (10) and is electrically commutated in a stator (60), and the sensor assembly (22) interacts with at least one magnetic sensor (72) located radially or axially relative to the sensor assembly (22).

12. A method for manufacturing a rotor as recited in claim 1, characterized by the following steps:

A retaining element (24) is fixed axially on a rotor shaft (18)

A hollow-cylindrical permanent magnet (22) is slid axially onto the rotor shaft (18)

A spacer component (34) is slid axially onto the rotor shaft (18)

A sensor magnet assembly (20) is slid with an annular carrier (36) onto the rotor shaft (18)

A second retaining element (25) is slid onto the rotor shaft (18), and it is pressed elastically against the first retaining element (24) using a specifiable contact pressure The second retaining element (25) is then fixed in position axially on the rotor shaft (18) so that the permanent magnet (20) and the sensor magnet assembly (22) are arranged one after the other in an axial direction and axially bear with their opposite ends against the rotatable retaining elements.

13. A rotor (10) of an electrical machine (12), comprising two rotatable retaining elements which are axially spaced from one another, at least one hollow-cylindrical, first permanent magnet (20), and a sensor magnet assembly (22),
wherein the first permanent magnet (20) and the sensor magnet assembly (22) are retained axially between the two rotatable retaining elements (24, 25) so that the permanent magnet (20) and the sensor magnet assembly (22) are arranged one after the other in an axial direction and axially bear with their opposite ends against the rotatable retaining elements, and
wherein the first permanent magnet (20) and the sensor magnet assembly, as well as both retaining elements (24, 25) are arranged on the single rotor (10).

* * * * *